Inventor
Earl H. Kidd
By
Wheeler, Wheeler, House & Clemency
Attorneys

United States Patent Office 3,608,291
Patented Sept. 28, 1971

3,608,291
CHUTELESS ROTARY MOWER HOUSING
Earl H. Kidd, Galesburg, Ill., assignor to Outboard Marine Corporation, Waukegan, Ill.
Filed Jan. 3, 1969, Ser. No. 788,803
Int. Cl. A01d 55/18
U.S. Cl. 56—320.1                                     4 Claims

ABSTRACT OF THE DISCLOSURE

A rotary mower housing having a top wall including a cutting and lifting portion, a compressing portion and a mulching portion in circumferential series in the direction of blade rotation. In addition, the housing has a sidewall deflector extending downwardly and outwardly from the housing sidewall.

BACKGROUND OF THE INVENTION

Chuteless housings for rotary mowers of the type contemplated herein are provided with a continuous depending or vertically disposed sidewall around the rotary blade of the mower. This sidewall is intended to prevent foreign objects from being thrown outwardly due to impact with the rotating blade of the mower. However, foreign objects which are hit by the rotating blade of the mower ricochet off the sidewalls until the objects finally bounce off the ground. Some of the foreign objects bounce off the ground at an angle sufficient to clear the lower edge of the sidewall and with sufficient force to cause damage or injury. A rotary mower having a housing with this type of sidewall also tends to distribute the grass clippings unevenly or in clumps behind the mower.

SUMMARY OF THE INVENTION

In this invention, a chuteless housing for a rotary mower is provided to evenly distribute grass clippings on the cut grass at the rear of the rotary mower. This housing has a top wall divided into a cutting and lifting portion across the front of the mower and compressing and mulching portions across the rear of the mower. The cutting and lifting portion provides a space above the blade of the mower that gradually increases in volume in the direction of blade rotation to accommodate the grass clippings cut and thrown upwardly by the blade into orbit in the top of the housing. The compressing and mulching portions deflect the accumulated grass clippings toward the blade for shredding or recutting and for eventual even distribution on the ground. Foreign objects are prevented from being thrown outwardly from the housing by a sidewall deflector provided on the outer surface of the sidewalls of the housing.

In one specific embodiment in accordance with the invention, the cutting and lifting portion accommodates an accumulation of orbiting grass clippings and extends upwardly from the top wall and arcuately for approximately 180°, while the compressing and mulching portion deflects the orbiting accumulation of grass clippings down within the side wall and extends downwardly from the cutting and lifting portion for approximately 90°. In this embodiment there is, thus, provided an accumulation accommodating means including a top wall portion spaced at a gradually increasing distance from the top wall of the housing in the direction of blade rotation and extending from about 9 o'clock to about 3 o'clock, together with deflecting means including another top wall portion spaced at a gradually decreasing distance from the top wall of the housing in the direction of blade rotation and extending from about 3 o'clock to about 6 o'clock.

Other objects and advantages will become apparent from the following detailed description when read in connection with the accompanying drawings in which.

DESCRIPTION OF THE INVENTION

Figure 1:
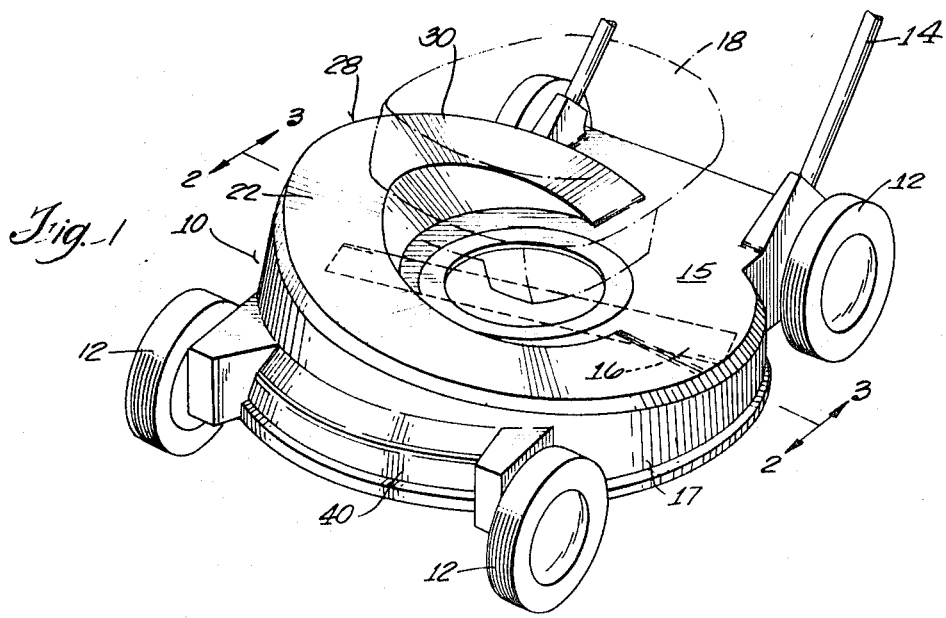
FIG. 1 is a perspective view of the rotary mower housing of the invention.
Figures 2, 3:
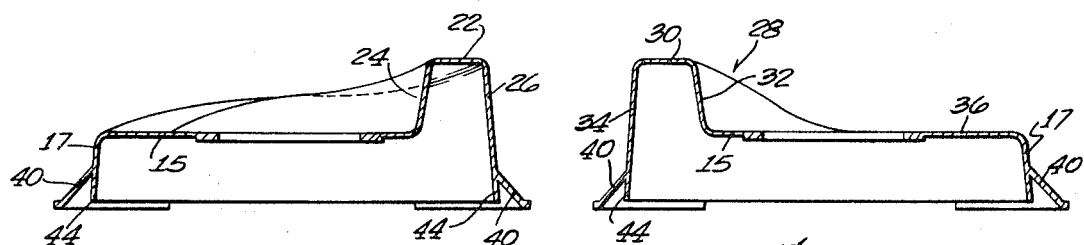
FIG. 2 is a view taken on line 2—2 of FIG. 1 showing the forward section of the housing.
FIG. 3 is a view taken on line 3—3 of FIG. 1 showing the rearward section of the housing shown in FIG. 1.
Figure 4:
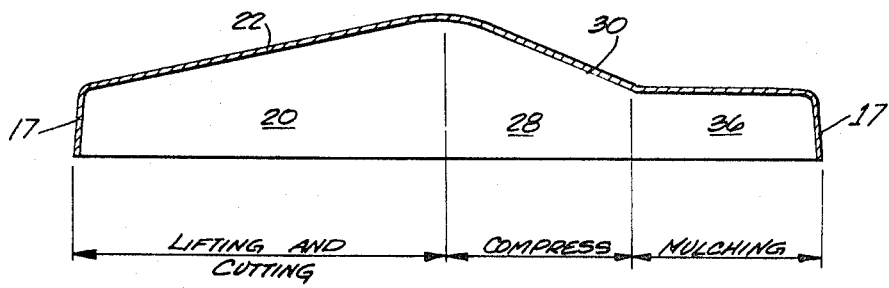
FIG. 4 is a straight line contour in section of the top wall of the housing.

A rotary mower of the type contemplated herein is shown in FIG. 1 and includes a chuteless housing 10 supported by a number of wheels 12 for movement in a spaced relation to the ground. The rotary mower is controlled and moved by pushing on a handle 14 which extends upwardly and rearwardly from the housing 10. The grass is cut by a rotary blade 16 (shown dotted) supported within the housing 10 on the drive shaft of an engine 18 mounted on the housing 10. The blade 16 can be rotated in either direction but in the description it will be assumed that the blade 16 is rotating clockwise. The grass is cut during the movement of the blade 16 across the front of the housing 10 with the grass clippings being thrown upwardly into the top of the housing where the grass moves in an orbital motion in the direction of blade rotation.

The housing 10 includes a top wall 15 and a depending or vertically disposed sidewall 17. Means are provided in the top wall 15 to accommodate the grass clippings as they accumulate in the top of the housing and move in an orbital motion in the direction of blade rotation. This means includes a cutting and lifting portion 20 which expands vertically to gradually increase in volume in the direction of blade rotation. More specifically, the cutting and lifting portion 20 extends circumferentially in the direction of blade rotation around the top wall 15 of the housing 10 for approximately 180° or across the entire front of the housing 10. The portion 20 includes a top panel 22 which is spaced from the plane of the top wall 15 an increasing distance throughout the full length of the cutting and lifting portion 20. The space below the top wall 22 is enclosed by means of annular sidewalls 24 and 26 provided on each side of the top wall 22.

The grass clippings are compressed and directed downwardly onto the rotating blade 16 by means of a compressing portion 28 which gradually decreases in volume in the direction of blade rotation. The portion 28 is in circumferential series with the cutting and lifting portion 20 forming a continuation thereof and extends circumferentially partially around the top wall 15 of the housing 10. The portion 28 includes a top panel 30 which decreases in height gradually from the cutting and lifting portion 20 downwardly to the top wall 15 of the housing 10 and is enclosed by means of the annular walls 32 and 34. The grass clippings as they are deflected downwardly into the path of the rotary blade 16 are shredded on impact with the blade to form a mulch that is partially deposited onto the ground beneath the compression portion 28.

Shredding of the grass clippings is completed by means of a mulching portion 36 formed by the top wall 15 of the housing 10 in circumferential series between the compressing portion 28 and the cutting and lifting portion 20. The remaining grass clippings are evenly deposited on the ground beneath the mulching portion 36.

Foreign objects entrapped within the housing 10 are prevented from being bounced outwardly from the housing by means of a sidewall deflector 40 mounted on the lower outer surface of the sidewall 17. The deflector 40 extends downwardly and outwardly from an intermediate point in the sidewall 17 of the housing to a plane below the lower edge 44 of the sidewall 17. Foreign objects that richochet off the ground will bounce up against the deflector 40 and will be deflected downwardly toward the ground.

What is claimed is:

1. A rotary mower housing adapated for mulching grass clippings and depositing the clippings below the housing, said housing having a continuous sidewall and a top wall including means for accommodating an accumulation of orbiting grass clippings, and means for deflecting the orbiting accumulation of grass clippings downwardly within said sidewall, said accumulation accommodating means including a first top wall portion spaced at a gradually increasing distance from said top wall in the direction of blade rotation and extending from about 9 o'clock to about 3 o'clock and said deflecting means including another top wall portion spaced at a gradually decreasing distance from the top wall of said housing in the direction of blade rotation and extending from said first top wall portion and from about 3 o'clock to about 6 o'clock.

2. A housing according to claim 1 including a deflector extending from said sidewall downwardly and outwardly from a point above the lower edge of said sidewall to a point below the lower edge of said sidewall.

3. A rotary mower housing adapted for mulching grass clippings and depositing the clippings below the housing, said housing having a continuous sidewall, a top wall extending from said side wall, means extending upwardly from said top wall and arcuately for approximately 180° around said top wall for accommodating an accumulation of obiting grass clippings, and means extending above said top wall and arcuately and downwardly from said accumulation accommodating means for approximately 90° around said top wall for deflecting the orbiting accumulation of grass clippings downwardly within said sidewall.

4. A housing according to claim 3 including a deflector extending from said sidewall downwardly and outwardly from a point above the lower edge of said sidewall to a point below the lower edge of said sidewall.

References Cited

UNITED STATES PATENTS

| 3,106,812 | 10/1963 | McDonagh | 56—25.4 |
| 3,190,061 | 6/1965 | Gilbertson | 56—25.4 |
| 3,226,920 | 1/1966 | Gilbertson | 56—255 |
| 3,378,995 | 4/1968 | Welsh | 56—255X |
| 3,432,183 | 3/1969 | Groll | 56—25.4X |
| 2,502,696 | 4/1950 | Barnes | 56—25.4 |
| 2,687,607 | 8/1954 | Sewell | 56—25.4 |
| 2,809,488 | 10/1957 | Sewell | 56—25.4 |
| 3,178,872 | 4/1965 | Swindler | 56—25.4 |
| 3,220,170 | 11/1965 | Smith et al. | 56—255 |
| 3,413,783 | 12/1968 | Gordon | 56—25.4 |

LOUIS G. MANCENE, Primary Examiner

J. A. OLIFF, Assistant Examiner

U.S. Cl. X.R.

56—255